(No Model.)
W. M. CHALK.
STEERING APPARATUS FOR WHEAT HEADERS.
No. 508,368. Patented Nov. 7, 1893.
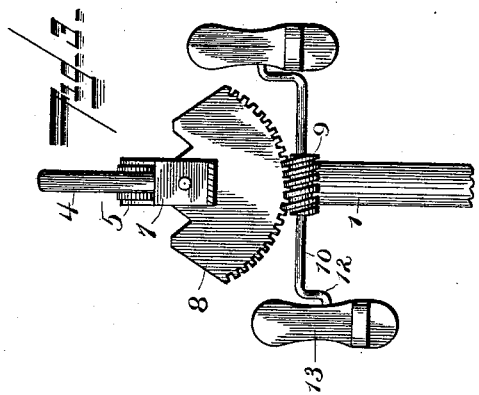
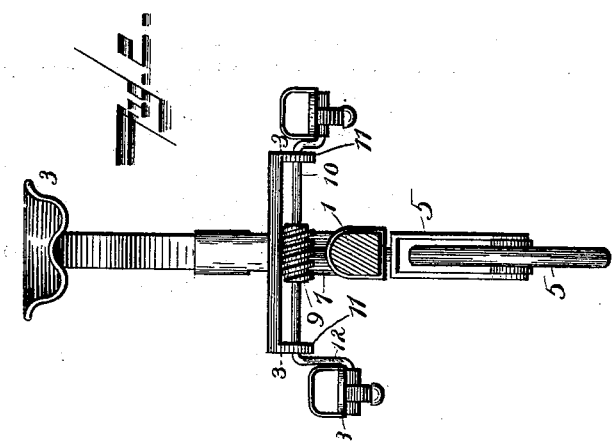
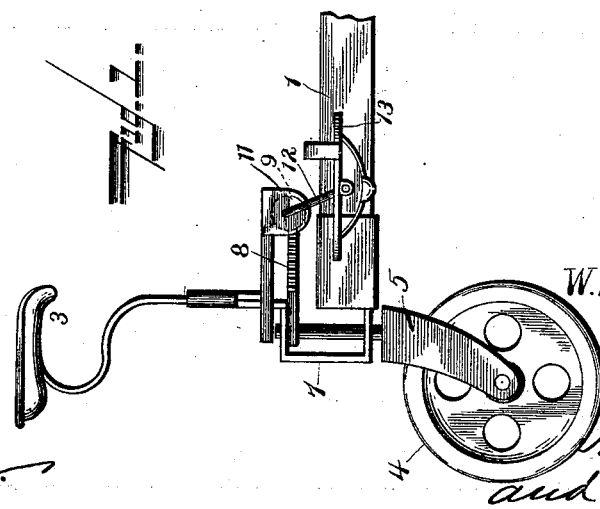
Witnesses
C. S. Frye
E. G. Julihn
W. M. Chalk.
Inventor
By Hopkins
and Atkins
Attorneys

UNITED STATES PATENT OFFICE.

WILLIAM McKAY CHALK, OF SPIVEY, ASSIGNOR OF ONE-HALF TO HOWARD A. POST, OF WICHITA, KANSAS.

STEERING APPARATUS FOR WHEAT-HEADERS.

SPECIFICATION forming part of Letters Patent No. 508,368, dated November 7, 1893.

Application filed December 9, 1892. Serial No. 454,588. (No model.)

*To all whom it may concern:*

Be it known that I, WILLIAM MCKAY CHALK, of Spivey, county of Kingman, and State of Kansas, have invented certain new and useful Improvements in Steering Apparatus for Wheat-Headers, of which the following is a specification, reference being had to the accompanying drawings.

The object of my invention is to produce improved mechanism for guiding a wheat header, which may be operated by the feet of a driver occupying a seat on the machine.

In the accompanying drawings, Figure 1 is a side elevation of a section of header, showing my steering apparatus. Fig. 2 is a front elevation thereof. Fig. 3 is a horizontal section, taken on the line 3, 3, of Fig. 2.

Referring to the figures on the drawings, 1 indicates the frame of any ordinary wheat header, which is provided with an upright spring seat 3.

4 indicates a steering-wheel carried in a suitable frame 5, which, by means of a vertical rod that is firmly supported in suitable bearings 7, is preferably located under the seat.

8 indicates a segmental gear meshing with a worm gear-wheel 9 carried upon the shaft 10 in suitable bearings 11 underneath the frame in front of the seat. The shaft preferably terminates in cranks 12 at each end, each of which is provided with a stirrup 13. The stirrups are preferably counterweighted to keep them in a horizontal position, and with confining strips over their toes, whereby the feet of the operator are held secure.

By pressure upon the cranks or pedals motion may be imparted to the shaft and to the worm gear-wheel thereon, thereby turning the steering-wheel upon its pivotal support. In this manner an operator may guide the header with great facility. The operation being performed by the feet, the hands are left free for use, and the facility of controlling the machine is greatly enhanced.

What I claim is—

1. In a steering apparatus for a wheat header, the combination with a frame and seat, of a movable steering wheel, a horizontal crank shaft operatively connected with the steering wheel, and pedals upon the cranks of the shaft, substantially as and for the purpose specified.

2. In steering apparatus for a wheat header, the combination with the frame and seat, of a steering-wheel, a segmental gear-carried thereon, a shaft, a worm-wheel meshing with the segmental-gear, cranks upon the ends of the shaft, and stirrups upon the cranks, all arranged and co-operating substantially as and for the purpose specified.

In testimony of all which I have hereunto subscribed my name.

WILLIAM McKAY CHALK.

Witnesses:
J. F. STANLEY,
J. D. ENLOW.